April 6, 1926.
W. A. HEARN
1,579,764
ANCHOR FOR SAFETY ATTACHMENTS
Filed Nov. 13, 1925
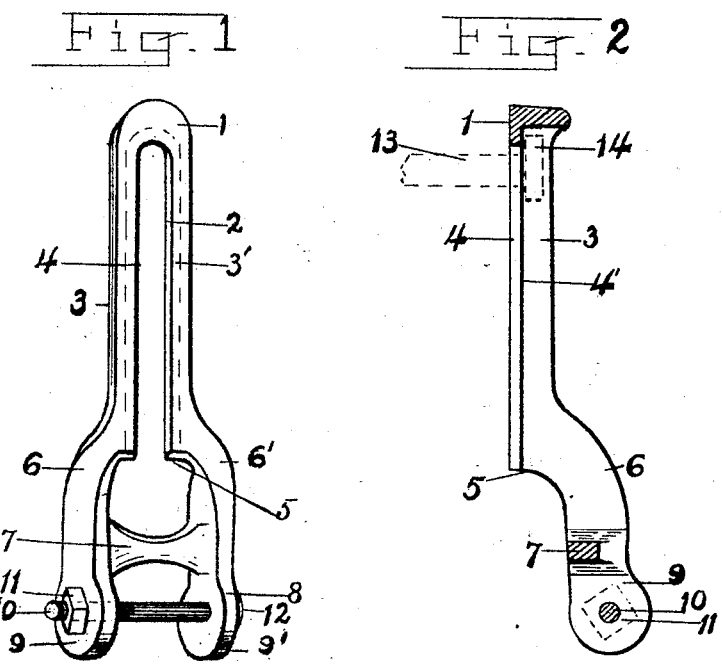
INVENTOR.
Walter A. Hearn
BY
Albert Rosenberg
ATTORNEY.

Patented Apr. 6, 1926.

1,579,764

UNITED STATES PATENT OFFICE.

WALTER A. HEARN, OF BALTIMORE, MARYLAND.

ANCHOR FOR SAFETY ATTACHMENTS.

Application filed November 13, 1925. Serial No. 68,929.

*To all whom it may concern:*

Be it known that I, WALTER A. HEARN, a citizen of the United States of America, and resident of Baltimore city, in the State of Maryland, of the United States of America (whose post-office address is 3615 Forest Park Avenue), have invented new and useful Improvements in Anchors for Safety Attachments, of which the following is a specification.

My invention relates to anchors for safety devices such as are used to anchor safety belts, etc., used by window cleaners, painters, etc., for attaching themselves to the window frames of buildings for the purpose of cleaning the windows or painting the frames of the windows, etc.; and my anchors may also be used to quickly attach a fire-escape device, such as a rope-ladder, etc.

The objects of my invention are first, to provide a new article of manufacture; second, to provide an anchor for safety attachments which can be readily attached to the safety attachment by any layman; thirdly, to provide an anchor with means for detachably securing it to safety belts, or to chain links, etc.; fourthly, to provide slidably attaching anchors with a detachable bolt for securing the anchor to the loop of a belt, or the link of a chain; fifthly, to provide an anchor with an elongated slot for engaging the head of a bolt and offset to permit the head of the bolt to enter the slot by placing the anchor above the head of the bolt and sliding it downwards over the head of the said bolt, and the offset sides of the anchor extending past the slotted portion of the anchor and braced with a yoke joining the two offset sides of the anchor away from the slotted part, and the sides of the anchor extending past the yoke and provided with a detachable bolt whereby the loop of a belt or the link of a chain may be attached to the anchor.

Referring to the drawings,—

Fig. 1 is a rear elevation of my improved anchor.

Fig. 2 is a sectional side elevation of my anchor.

The numeral 1 is the yoke joining the sides 3 and 3' of my improved anchor between which sides is a slot 2—4 which allows the anchor to slide over the shank 13, indicated by dotted lines, of an anchor bolt which is provided with a head 14 which engages the inner surface 4' of the sides 3 and 3' to secure my anchor to the said anchor bolt 13. The offset parts 6 and 6' are offset at approximately right-angles to the plane of the body of the material through which the slot 2—4 is formed by spacing the sides 3 and 3' with the yoke 1, and the yoke 7 spacing and securing the offset parts 6 and 6'.

5 indicates the entrance of the slot 2—4, which is formed by the offsets 6 and 6', said offsets joining the sides 3 and 3' to permit the head 14 of the anchor bolt 13 to readily enter the slot 2—4 of my anchor, and these offset parts 6 are secured together by a yoke 7 to strengthen my anchor and to prevent the detachable bolt 10 from bending the ends 9 and 9'. The end 9' is engaged by the head 12 of the bolt 10 and the end 9 is engaged by the detachable nut 11.

To attach my anchor to the loop at the end of a safety belt or to the link of a chain, it is only necessary to unscrew the nut 11 and remove the bolt 10 far enough to slip the loop, of the safety belt, over the said bolt 10 and then replace the bolt 10 and secure the nut 11 onto the bolt 10.

Heretofore it has been necessary to attach anchors for safety devices to the safety device by using an open link or hook, or by placing the end of the safety belt over the yoke of a slidably detachable anchor device and then sewing the end of the belt or riveting it to the belt, making the anchoring device non-detachable from the safety belt or chain; and when a different type of anchoring device is required because a different type of anchoring fixture is already secured to a building upon which it is desired to use the safety belt or other device, it has been heretofore found impossible to attach the safety device because the anchor did not fit the different types of anchor fixtures.

But by making the anchor detachably secured to the safety belt or other safety device, a hook anchor or other type of anchor can readily be substituted for the slotted anchor, or vice versa.

Some anchor bolts are provided with eyes instead of square or round heads, and anchors of my type would have to be detached and another type of anchor substituted which would engage the eye of the anchor bolt, or another safety belt woud be required with such a fixture secured to it.

What I claim is—

1. An anchor for safety attachments, comprising an anchoring means provided with an elongated slot the sides of which are spaced and secured together by a yoke at one end and open at its opposite end, said sides offset approximately at right-angles to the plane of the body through which said slot is formed, said offset parts spaced and secured by a yoke, the ends of the said offset parts extending past the said latter mentioned yoke and bored to engage a bolt.

2. An anchor for safety devices, comprising an anchoring means yoked at one end and provided with an elongated slot and open at the opposite end of the slot and provided with sides offset at the said open end of said slot at approximately right-angles to the plane of the body through which said slot is formed, said offset parts joined by an integral yoke past the open end of the said slot, and said sides provided with means past said yoke for engaging a bolt, and means for detachably securing said bolt to said sides.

3. An anchor for safety devices, comprising the yoke 1 spacing and securing the sides 3 and 3' forming the slot 2—4, the opposite end of said slot 2—4 being open, said sides secured to the offset parts 6 and 6' and offset approximately at right-angles to the plane of the body through which the said slot is formed, and the said offset parts 6 and 6' spaced and secured by the yoke 7; the ends 9 and 9', of said offset parts 6 and 6', extending past said yoke 7, and the bolt 10 with its head 12 and nut 11 for detachably securing the anchor to a safety device.

WALTER A. HEARN.